United States Patent

Iida et al.

[11] Patent Number: 6,108,465
[45] Date of Patent: Aug. 22, 2000

[54] OPTICAL PULSE GENERATOR

[75] Inventors: Rikihiro Iida; Akio Ichikawa; Yoshihiro Kumagai; Yuka Asahina; Masataka Nakazawa; Eiji Yoshida, all of Tokyo, Japan

[73] Assignees: Ando Electric Co., Ltd.; Nippon Telegraph and Telephone Corporation, both of Tokyo, Japan

[21] Appl. No.: 09/172,255

[22] Filed: Oct. 14, 1998

[30] Foreign Application Priority Data

Oct. 14, 1997 [JP] Japan ................................ 9-280914

[51] Int. Cl.⁷ ...................................................... G02B 6/26
[52] U.S. Cl. .................................. 385/15; 385/24; 385/27; 372/25; 372/30
[58] Field of Search ............................... 385/15, 24, 27, 385/39; 372/25, 30, 38

[56] References Cited

U.S. PATENT DOCUMENTS 5,590,142 12/1996 Shan .............................................. 372/18
5,926,492 7/1999 Yoshida et al. ............................... 372/6

FOREIGN PATENT DOCUMENTS 0 723 320 7/1996 European Pat. Off. ......... H01S 3/098
08018139 1/1996 Japan ................................ H01S 3/102
091139536 5/1997 Japan ................................. H01S 3/13

OTHER PUBLICATIONS

Nakazawa, M., et al., Electronic Letters, Jul. 1997, 33(15):1318–1320.

Shan, X., et al., Electronic Letters, May 1996, 32(11):1015–1016.

*Primary Examiner*—Rodney Bovernick
*Assistant Examiner*—Sarah N Song
*Attorney, Agent, or Firm*—Darby & Darby

[57] ABSTRACT

The object of the present invention is to provide an optical pulse generator which very stably generates for a long period of time a high cycling frequency optical pulse chain. In order to obtain this object, in a ring type resonator R, the present invention provides an optical path length regulator 14 which performs high precision optical path length adjustment and an optical path length regulator 60 which performs wide range optical path length adjustment, and extracts a clock signal by converting an optical pulse emitted from the ring type resonator R to an electrical signal by a clock extractor 42, detects the frequency difference between a base frequency signal output form a synthesizer 52 by a frequency difference detector 50, and controls said optical path length regulator 14 and said optical path length regulator 60.

9 Claims, 5 Drawing Sheets

OPTICAL PULSE GENERATOR

FIELD OF THE INVENTION

The present invention relates to an optical pulse generator which stably generates a high cycling frequency optical pulse which is necessary for constructing very high speed communication systems.

BACKGROUND ART

In recent years, optical fibers have come to be widely used as a communication path. In communication by optical fibers, transmission of large volumes of information is possible. At the present, with the development of multimedia and transmission of a variety of information as digital information on a world-wide scale, optical fibers have come to be used as the preferred communication path.

Thus, it is not difficult to imagine that the use of optical fibers as communication paths will flourish in the future.

One important factor when using optical fibers as a communication path is the light source, in particular, for example, the precision of a pulse light source. One important factor related to the precision of the light source is that the wavelength of the light emitted does not vary with changes in the environment (for example, changes in temperature, etc.).

SUMMARY OF THE INVENTION

In consideration of the above, the object of the present invention is to provide an optical pulse generator which can generate an extremely stable high cycling frequency optical pulse train over a long period of time.

In order to obtain the above object, the present invention provides an optical amplifying means having high gain in a specified wavelength band, a first optical path length regulator which performs high precision optical path length regulation, a second optical path length regulator which carries optical path length regulation over a wide range, a laser pulse generator in which optical modulators arranged in a ring modulate the incident light and transform it into an optical pulse, a clock signal extractor which converts the laser optical pulse emitted from said laser pulse generator into an electrical signal, and extracts a clock signal of an integral multiple of the cycling frequency of a base frequency corresponding to the length of said loop, a frequency difference detector which detects the difference between a predetermined reference frequency signal and said clock signal, and a control means which controls the first optical path length regulator and the second optical path length regulator depending on the output signal from said frequency difference detector.

This invention obtains the effect that a very high cycling frequency optical pulse train can be generated extremely stably over a long period of time because the length of a resonator of a laser oscillator is regulated by providing two optical path length regulators with differing characteristics, detecting with a frequency voltage converter the difference in frequency between a clock signal and a reference frequency signal obtained by converting an optical pulse into an electrical signal, and supplying the control signal to these two optical path length regulators which varies according to changes in the frequency difference.

In addition, the present invention is characterized in the second optical path length regulator adjusting the optical path length by adding a temperature change to an optical pulse compression optical fiber.

In addition, the present invention is characterized in providing a high precision first frequency voltage converter which splits the output of the frequency difference detector and inputs one of the relevant outputs, a broad frequency band second frequency voltage converter which inputs the other relevant output, a first control means which controls the first optical path length regulator according to the output signal of the first frequency voltage converter, and a second control means which controls the second optical path length regulator according to the output signal of the first and second frequency voltage converters.

In addition, the present invention is characterized in providing a central control means which detects the output signal to the first optical path length regulator and the output signal of the frequency difference detector, and controls the second optical path length regulator so that the control signal to the first optical path length regulator does not exceed a specified control limit.

In addition, the present invention is characterized in the central control means detecting the output signal of the frequency difference detector, and when the frequency detection range of the first frequency voltage converter is exceeded, causes the output signal of the frequency difference detector to return within the detection range of the first frequency voltage converter by controlling the first and second optical path length regulators.

In addition, the present invention is characterized by the central control means which recognizes the size relation between the frequency of the reference frequency signal and the clock signal by adding a change to the control signal to the first optical path length regulator and detecting the output signal of the frequency difference detector, and thereby controlling said second path length regulator.

DETAILED DESCRIPTION OF THE PREFERRED EMBODIMENTS

First, before explaining the embodiments of the present invention, the optical pulse generator assumed in the present invention will be explained.

Figure 5:
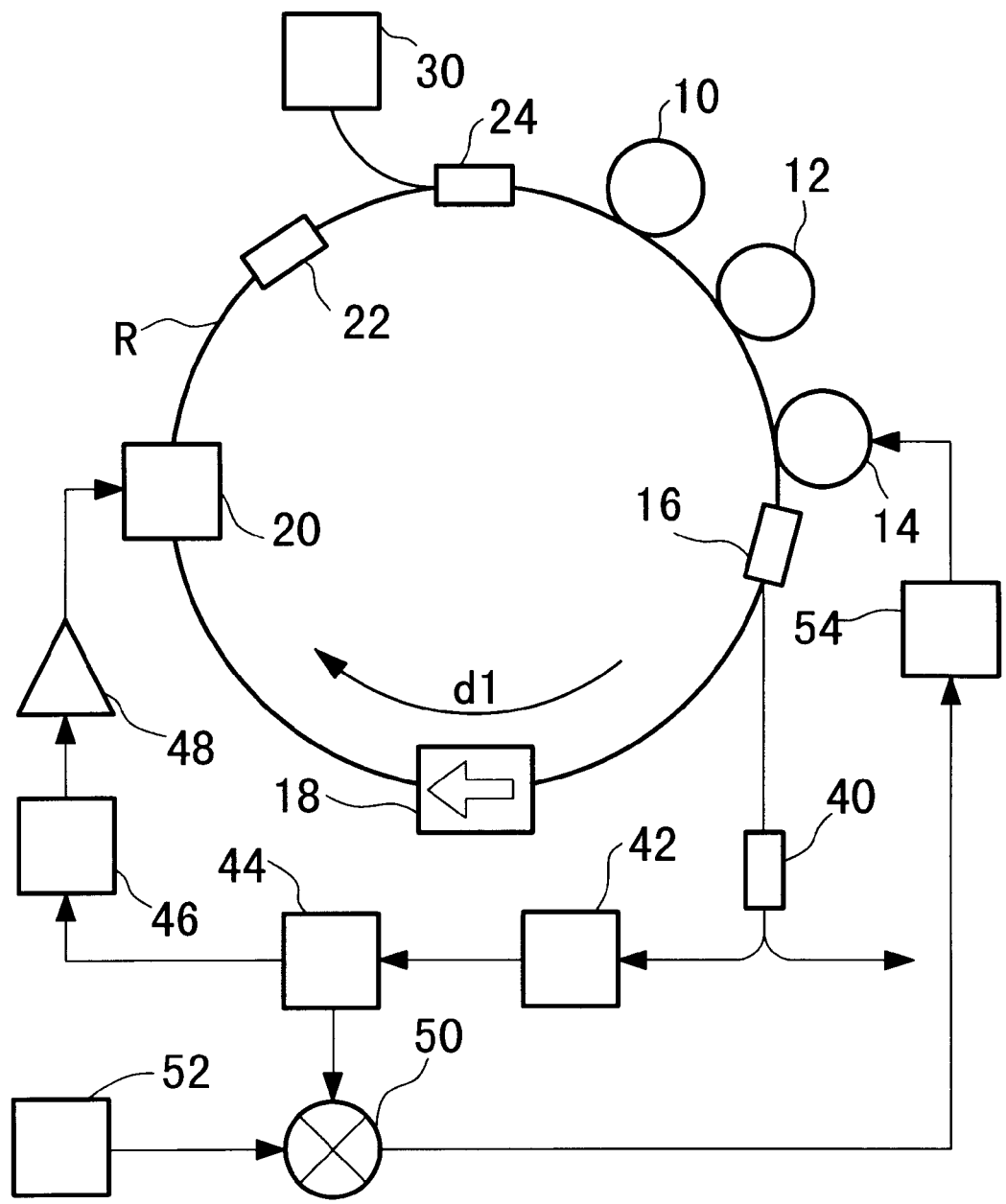
FIG. 5 is a block diagram showing an example of the structure of an optical pulse generator assumed in the present invention.

FIG. 5 is a block diagram showing an example of the structure of the optical pulse generator assumed in the present invention.

As shown in FIG. 5, the optical pulse generator has a ring type resonator R.

This ring type resonator R connects in order a rare-earth doped optical fiber 10, an optical pulse compression optical fiber 12, an optical path length regulator 14, an optical splitter 16, an optical isolator 18, an optical modulator 20, an optical filter 22, and an optical coupler 24.

The rare-earth doped optical fiber 10 is doped with a rare earth element such as erbium, excited by an external light source (light source 30, explained below), and radiates and amplifies the frequency of the light fixed by the doped element.

The optical pulse compression optical fiber 12 compresses the pulse range of the incident optical pulse, and emits an optical pulse having a narrow pulse band.

The optical path length regulator 14 is for regulating the optical path length of the ring resonator, and by regulating the optical path length of the ring type resonator R by this optical path length regulator 14, the conditions for resonation of the ring resonator are attained.

The optical splitter 16 is for extracting to the outside a part of the optical pulses circulating through the ring type resonator R. Because the pulse extracted out of the ring type resonator R by the optical splitter 16 are only optical pulses having a phase satisfying the resonation conditions of the ring type resonator R, the emitted optical pulses are a laser.

The isolator 18 fixes the circulation direction of the optical pulse in the ring type resonator R. That is, the optical pulse circulates in the direction of reference symbol d1 in the figure, and because optical pulses propagating in a direction opposite to the direction shown by the reference symbol d1 cannot transit the optical isolator, the optical pulses only circulate in the direction shown by the reference symbol d1.

The optical modulator 20 is for carrying out intensity modulation of the light circulating through the ring type resonator based the clock signal described below, and generating the optical pulse. The light emitted from the above-described rare-earth doped optical fiber 10 and not circulating through the ring type resonator R does not become optical pulses, and by being modulated by this optical modulator, is converted into an optical pulses.

The optical filter 22 has a specified pass bandwidth, has the characteristic of intercepting light of a frequency not includes in this pass bandwidth, and is provided in order to limit the wavelength of the generated optical pulse to within the amplifier band of the rare-earth doped optical fiber 10, and both eliminate spontaneously emitted light emitted from the above-described rare-earth doped optical fiber 10 and the light of unnecessary frequencies emitted from the excitation light source 30 described below.

The optical coupler 24 is for guiding the excitation light emitted from the excitation light source 30 to the ring type resonator R.

The excitation light source 30 is a light source for exciting the rare-earth doped optical fiber 10.

Reference numeral 40 in the figure is an optical splitter, and is connected to the optical splitter 16 in the ring type resonator, and is for splitting the optical pulse emitted from the ring type resonator R. One beam of the split optical pulses is used, for example, in a very high speed optical communication system.

The other beam of the optical pulses split by the optical splitter 40 is incident on the clock extractor 42.

The clock extractor 42 is for extracting the clock signal based on the incident optical pulse. This clock extractor 42 may comprise, for example, an optical receiving element which converts the incident optical pulse into an electrical signal, and an electrical amplifier which amplifies a narrow band filter and the output of this narrow band filter.

That is, the clock extractor 42 is for converting what is termed the incident optical pulse into the clock signal of the electrical signal.

Reference numeral 44 is an electrical splitter, and splits the clock signal emitted from the clock extractor 42, outputs one of the split off clock signals to the phase shifter 46, and sends the other signal to the frequency difference detector 50.

The above phase shifter 46 is for regulating the phase of the input clock signal. The electrical amplifier 48 amplifies the clock signal output from the phase shifter 46. The clock signal output from the electrical amplifier 48 is input into the optical modulator 20 of the ring type resonator R.

Reference numeral 52 in FIG. 5 is a synthesizer which outputs a reference frequency signal having a specified frequency. The above frequency difference detector 50 detects a difference in frequency between the reference frequency signal output from the synthesizer 52 and the clock signal split off in the electrical splitter 44, and outputs this difference signal. This difference signal is output to the control circuit 54.

The control circuit 54 outputs the control signal based on the input reference signal to the optical path length regulator 14, and performs control which regulates the optical path length of the ring type resonator R.

In the above-described structure, the high cycling frequency optical impulse is generated in accordance with the following explanation.

When the excitation light is emitted from the excitation light source 30, it is incident on the ring type resonator R via the optical coupler 24. The excitation light which is incident on the ring type resonator R is propagated along the rare-earth doped optical fiber 10, and excites the rare-earth doped optical fiber 10. Light of a specified wavelength is radiated from the excited rare-earth doped optical fiber 10. This radiated light is propagated along the ring type resonator R in the direction shown by the reference symbol dl in the figure, and is incident on the optical modulator 20 via the optical pulse compression optical fiber 12, the optical path length regulator 14, the optical splitter 16, and the optical isolator 18. When the light radiated from the rareearth doped optical fiber 10 is incident on the optical modulator 20, it is converted into an intensity modulated optical pulse. The converted optical pulse is propagated along the ring type resonator R in the direction shown by the reference symbol dl in the figure, and is incident on the rare-earth doped optical fiber 10 via the optical filter 22 and the optical coupler 24.

In the rare-earth doped optical fiber 10, because the excitation light is incident from the light source 30, the optical pulse which circulates one time through the ring type resonator R is amplified, and propagates along the ring type resonator R in the direction of the reference symbol d1. When this amplified light arrives at the optical modulator 20, it is pulsed, and the optical pulses are propagated along the ring type resonator R in the following manner.

While the above optical pulses are circulating along the ring type resonator R, one part of the circulating light pulse is split off by the optical splitter 16, and emitted to the exterior of the ring type resonator R. The optical pulse emitted to the exterior of the ring type resonator R is split by the optical splitter 40, and one part of the split off light is used, for example, in a very high velocity communication system.

In addition, the other split off optical pulse is incident on the clock extractor 42, and an electrical clock signal is extracted. The extracted clock signal is output to the electric splitter 44.

One part of the split off clock signal is input into the phase shifter 46, the phase is adjusted, is amplified in the electric amplifier 48, and input into the optical modulator 20. The optical modulator 20 intensity modulates laser light based on this clock signal, and outputs the optical pulse.

In addition, the other part of the split clock signal is output to the frequency difference detector 50, and in the frequency detector 50, the frequency difference between the reference frequency signal output from the synthesizer 52 and the clock signal split off in the electrical splitter is detected, and the difference signal is output. This difference signal is output to the control circuit 54, and based on this input difference signal, the control signal is output to the optical path length regulator 14, and the control for regulating the optical path length of the ring type resonator R is carried out.

Generally, if the resonator length (the physical length of the loop of the ring type resonator) is L, the refractive index of the optical fiber is n, and the speed of light is c, then the base frequency determined by the resonator length is:

$$f_0 = c/(nL).$$

Here, when the modulated frequency is set at a multiple q of the base frequency, that is, when:

$$qf_0 = qc/(nL),$$

(q being an integer), then by supplying the clock signal which agrees with the multiple q of the base signal to the optical modulator, the modulated frequency and the cycling frequency of the optical pulses agree, and high coherent mode synchronicity is obtained.

Here, when only the temperature $\Delta t$ of the optical fiber forming the ring type resonator R is changed, only the length $\Delta L$ of the optical fiber changes, and at the same time, because the base frequency $f_0$ determined by the resonator length changes, in comparison with the modulated frequency $f$ $(=q\,f_0)$ before the temperature change, only the fluctuation frequency $\Delta f$ will deviate.

$$\Delta f/f = \Delta L/L = \alpha \Delta t \ldots \quad (1)$$

where L is the resonator length before the temperature change and $\alpha$ is the coefficient of linear expansion of the optical fiber. The fluctuation frequency $\Delta f$ of the modulated frequency is obtained by extracting one part of the clock signal extracted by the clock extractor 42 and detecting the frequency difference between it and the synthesizer 52 by the frequency difference detector 50, and the control circuit 54 controls the optical path length regulator 14 so that the fluctuation frequency $\Delta f$ of the modulated frequency disappears. By using this type of active negative feedback circuit which automatically adjusts the resonator length, the changing of the base frequency $f_0$ along with the temperature fluctuation can be restrained, and the cycling frequency can generate a stable optical pulse train.

Moreover, the technology for this type of optical pulse generator is disclosed, for example, in Japanese Patent Application, First Publication, No. Hei 8-18139.

However, in the above-described optical pulse generator assumed in the present invention, in the optical path length regulator 14 the range within which the resonator length can be adjusted is limited. That is, when the control limit of the resonator length due to temperature change is exceeded, the fluctuation in the resonator length due to the temperature change cannot be completely restrained, and as a result, the base frequency $f_0$ varies with time.

As the above-described optical path length regulator 14, having a structure wherein a tubular piezoelectric ceramic element is wrapped with an optical fiber is used, and by applying a control voltage to the tubular piezoelectric ceramic, the wrapped optical fiber expands, and the resonator length is adjusted. However, there is a limit on this adjustment range.

For example, the length which can be adjusted by the optical path length regulator 14 is about 2 mm, and when the resonator length L=200 m, f=10 GHz, the expansion coefficient $\alpha = 10^{-5}$, by the above Eq. 1, the differential frequency $\Delta f = 100$ kHz and the temperature change $\Delta t = 1^\circ$ C.

That is, if the temperature change of the optical fiber is not within $1^\circ$ C., there is the problem that an optical pulse chain with a stable cycling frequency cannot be generated.

In consideration of the above circumstances it is an object of the present invention to provide an optical pulse generator which can very stably generate over a long period of time a high cycling frequency optical pulse.

Below, the optical pulse generator according to the embodiments of the present invention will be explained in detail in reference to the drawings.

First Embodiment

Figure 1:
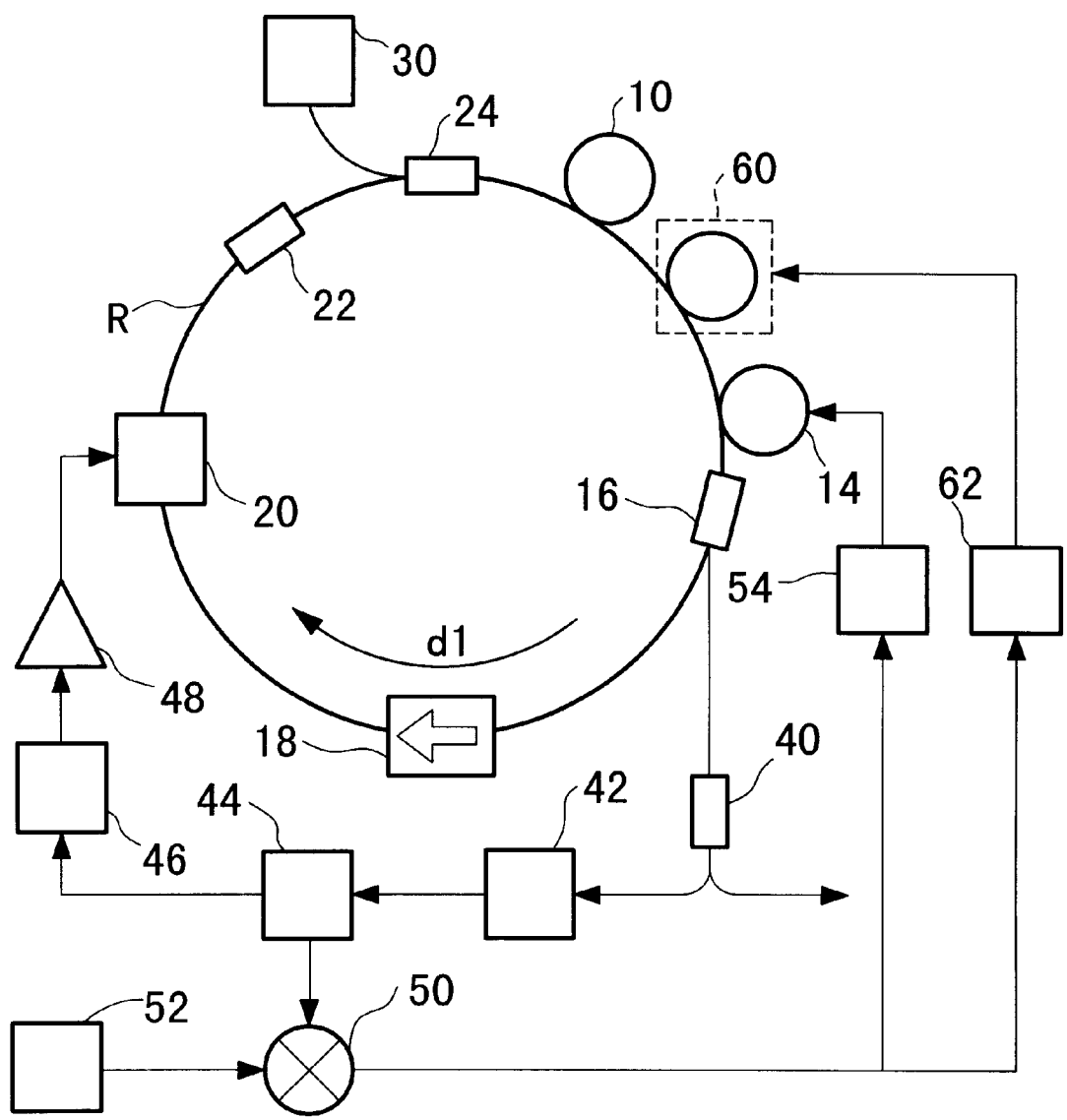
FIG. 1 is a block diagram showing the structure of the optical pulse generator according to the first embodiment of the present invention.

First, the optical pulse generator of the first embodiment of the present invention will be explained with reference to FIG. 1. FIG. 1 is a block diagram showing the construction of the optical pulse generator according to the first embodiment of the present invention.

In FIG. 1, the optical pulse generator has a ring type resonator R. This ring type generator R connects in order a rare-earth doped optical fiber (the optical amplifying means) 10, an optical path length regulator (the second optical path length regulator) 60, an optical path length regulator (the first optical path length regulator) 14, an optical splitter 16, an optical isolator 18, an optical modulator 20, and optical filter 22, and an optical coupler 24.

The rare-earth doped optical fiber 10 is doped with a rare-earth element such as erbium, is excited by an external light source (the light source 30 described below), and light of a wavelength determined by the dopant is radiated and amplified.

The optical path length regulator 14 is for adjusting the optical path length of the ring resonator, and the optical path length of the ring resonator R is adjusted by this optical path length regulator 14, thereby obtaining resonance conditions for the ring resonator.

In contrast to the optical path length regulator 14 in FIG. 1 which can provide high precision optical path length control, the optical path length regulator 60 can provide optical path length regulation over a wide range. That is, in the present embodiment, the most important point is being provided with two optical path length regulators, the optical path length regulator 14 which can control the optical path length with high precision, and the optical path length regulator 60 which can regulate the optical path over a wide range.

The optical splitter 16 is for extracting one part of the optical pulse circulating along the ring type resonator R to the outside. Because the optical pulses extracted to the outside of the ring type resonator R by the optical splitter 16 are the only optical pulses having a phase satisfying the resonance conditions of the ring type resonator R, the emitted optical pulses are laser light.

The optical isolator 18 determines the direction of circulation of the optical pulse in the ring type resonator R. That is, the optical pulse circulates in the direction shown by the reference symbol d1 in the figure, but because optical pulses propagating in a direction opposite to the direction shown by this reference symbol d1 cannot transit the optical isolator 18, optical pulses can only circulate in the direction shown by the reference symbol d1.

The optical modulator 20 provides intensity modulation of the light circulating along the ring type resonator R based on the clock signal described below, and is for generating the optical pulse. Light which is emitted from the rare-earth doped optical fiber 10 described above and has not circulated one time around the ring type modulator 20 has not become optical pulses, but is changed into optical pulses by being modulated by this optical modulator 20.

The optical filter 22 has a specified passing bandwidth, and the light with a wavelength not encompasses within this passing bandwidth has the characteristic of being excluded, and in addition to restricting the wavelength of the generated optical pulses within the amplification band of the above-described rare-earth doped optical fiber 10, is provided in order that spontaneously emitted light emitted from the above-described rare-earth doped optical fiber 10 and unnecessary wavelengths of light emitted from the excitation light source 30 described below, are excluded.

The optical coupler 24 is for guiding the excitation light emitted from the excitation light source 30 to the ring type resonator R.

This excitation light source 30 is a light source for exciting the rare-earth doped optical fiber 10.

Reference numeral 40 in the figure is an optical splitter, is connected to the optical splitter 16 in the ring type resonator R, and is for splitting off the optical pulses emitted from the ring-type resonator R. One part of the split off optical pulses are used, for example, in a very high speed communication system.

The other optical pulses split by the optical splitter 40 are incident on the clock extractor (clock signal extractor) 42.

The clock extractor 42 is for extracting a clock signal based on the incident optical pulses. This clock extractor 42 comprises, for example, a light receiving element which converts the incident optical pulses into electric signals, and an electric amplifier which amplifies narrow band filter and the output of this narrow band filter.

That is, the clock extractor 42 is for converting the incident optical pulses into electric clock signals.

Reference 44 is an electric splitter which splits off the clock signal output from the clock extractor 42, and outputs one part of the split off clock signal to the phase shifter 46, and the other part is split off to the frequency difference detector 50.

The above-described phase shifter 46 is for adjusting the phase of the input clock signal. The electrical amplifier 48 amplified the clock signal output from the phase shifter 46. The clock signal output from the electrical amplifier 48 is input into the optical modulator 20 of the ring type resonator R.

Reference numeral 52 in FIG. 5 is a synthesizer, and outputs a reference frequency signal having a specified frequency. The above frequency difference detector 50 detects the frequency difference between the reference frequency signal output from the synthesizer 52 and the clock signal split off by the electrical splitter 44, and outputs a difference signal. This difference signal is input to the control circuit (the first control means).

The control circuit 54 outputs to the optical path length regulator 14 a control signal based on the input difference signal, and carries out control for adjusting the optical path length of the ring type resonator R.

In addition, reference 62 in FIG. 1 is a control circuit (the second control means) for carrying out control of the optical path length regulator 60.

Moreover, the control circuit 54 and the control circuit 62 are the control means.

For example, when using as an optical path length regulator 14 a tubular piezoelectric ceramic element wrapped with optical as used in conventional technology, the control range of the resonator length is about 2 mm, the optical path length L=200 m, f=10 GHz, and the linear expansion coefficient $\alpha=10^{-15}$, by the above-described Eq. 1, $\Delta f$=100 kHz and $\Delta t$=1° C. That is, when there is fluctuation of 100 kHz or greater of the cycling frequency due to external factors such as temperature, an optical path length regulator 60 is necessary.

Now the optical path length regulator 60 will be explained. If the length of the resonator described above (the length of the loop of the ring type resonator R) is L, the refractive index of the optical fiber is n (about 1.48), the speed of light is c (about $3\times10^8$m / sec), then the base frequency determined by the resonator length L, $f_0$=c/(nL), is 1 MHz. That is, in the present embodiment, a pulse resonating mode exists at f=10 GHz at about a 1 MHz interval. If the adjustment range of the optical path length regulator 60 is 1 MHz or greater, it is possible to carry out control so as to arbitrarily set the cycling frequency at the f=10 GHz band.

From the above, it is a necessary condition that the optical path length regulator 60 has a wider optical path length adjustment range than the optical path length regulator 14, and it is preferable that it have an adjustment range for the resonant length corresponding to the base frequency.

Second Embodiment

Next, the optical pulse generator according to the second embodiment of the present invention will be explained.

The optical pulse generator according to the second embodiment of the present invention has almost the same construction as the optical pulse generator according to the first embodiment shown in FIG. 1, but differs on the point that the optical path length regulator 60 adjusts the optical path length by providing a temperature adjustment on to an optical pulse compression optical fiber.

An optical pulse compression optical fiber, such as that disclosed in Japanese Patent Application, First Publication, Number Hei 8-18139, is provided in a ring type resonator in order to generate optical pulses with short pulse widths by using the optical soliton effect. In the conventional optical pulse generator explained referring to FIG. 5 as well, an optical pulse compression optical fiber 12 is used in a ring type resonator.

Here, the largest part of the resonator length of the ring type resonator is made up of the optical pulse compression optical fiber 12, and when the resonator length L=200 m, the modulation frequency fluctuation $\Delta f$=1 MHz, and the modulation frequency f before fluctuation is 10 GHz, then from Eq. 1 described above, the change in the length $\Delta L$ of the optical pulse compression optical fiber is 20 mm and the fluctuation in temperature $\Delta t$ is $\Delta L \Delta t$=10° C. That is, by using a 200 m optical pulse compression optical fiber on the optical path length regulator 60 in FIG. 1, and maintaining it within a range of 10° C., the following width of the fluctuation of the cycling frequency is greatly widened, and in addition, it is possible to set and control the cycling frequency at an arbitrary frequency in the 10 GHz band, and generate a very stable optical pulse train over a long period of time.

Third Embodiment

Figure 2:
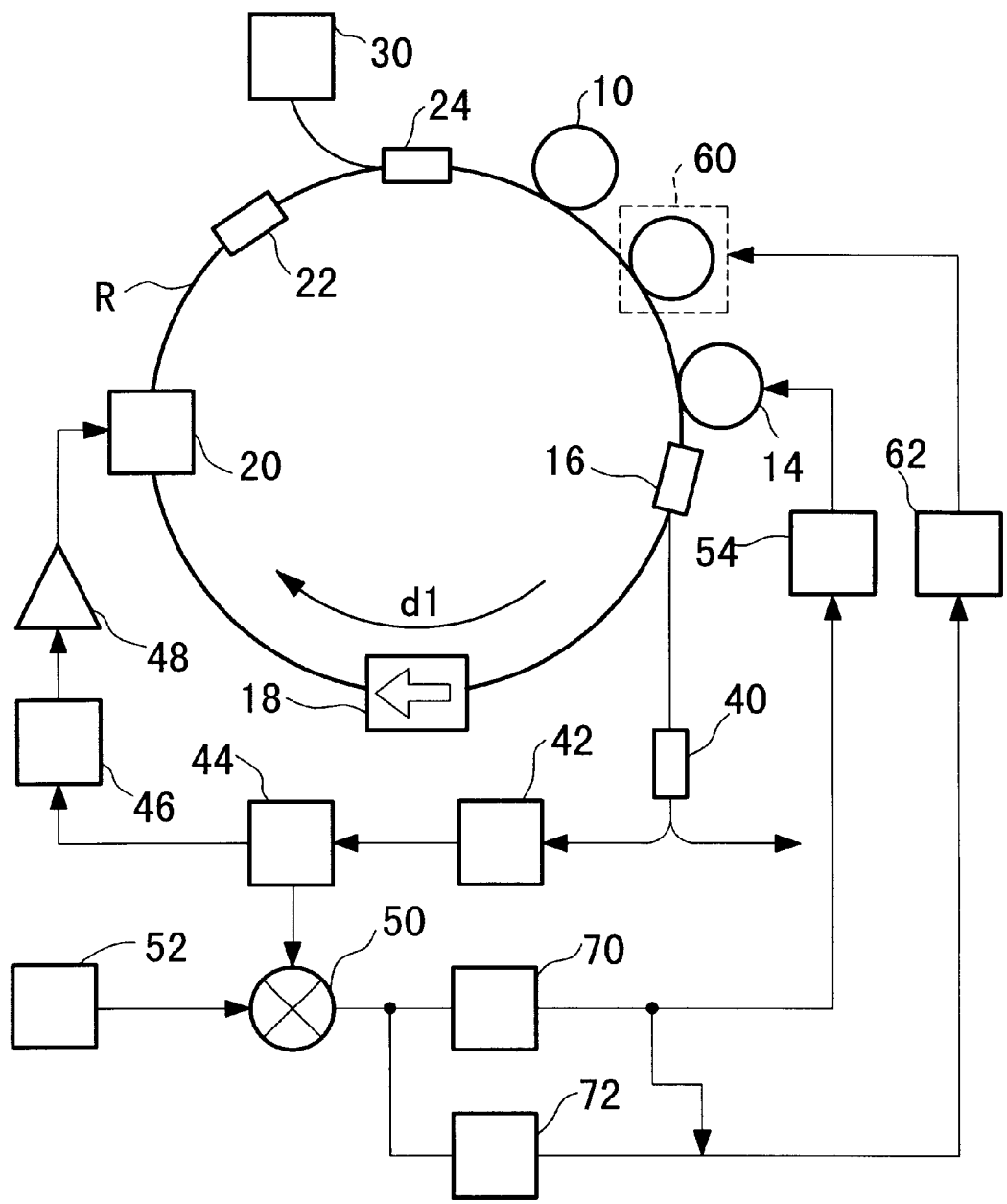
FIG. 2 is a block diagram showing the structure of the optical pulse generator according to the third embodiment of the present invention.

Next, the optical pulse generator according to the third embodiment of the present invention will be explained referring to FIG. 2. FIG. 2 is a block diagram showing the structure of an optical pulse generator according to the third embodiment of the present invention. The same reference symbols denote the same parts of the optical pulse generator according to the first embodiment of the present invention shown in FIG. 1, and their explanations are omitted.

The optical pulse generator according to the third embodiment of the present invention shown in FIG. 2 differs from the optical pulse generator according to the first embodiment of the present invention in having a frequency voltage converter (a first frequency voltage converter) 70 and a frequency voltage converter (a second frequency voltage converter) 72 provided between the frequency difference detector 50, the control circuit 54, and the control circuit 62.

In the present embodiment, the optical path length regulator 14 and the optical path length regulator 60 are controlled by detecting the frequency difference between the reference frequency output from the synthesizer 52 and the clock signal, and in order to control the optical path length regulator 14 which can control the optical path length with high precision, it is necessary to provide a frequency voltage converter 70 which can detect the frequency difference with high precision, and in order to control the optical path length regulator 60 which can control the optical path length over a wide range, it is necessary to provide a frequency voltage converter 72 which can detect frequency differences over a wide range. Therefore, the most important point of the present embodiment is the point that the frequency voltage converters 70 and 72 cannot be used together and are provided as separate units.

As described above, the frequency control range of the optical path length regulator 14 is 100 kHz, but in order to perform frequency control with higher accuracy, it is necessary to increase the precision of the error detection.

For example, a representative frequency voltage converter has an full-scale output voltage of 10 V, and in addition, if in the usual electrical circuit it is difficult to accurately detect a voltage of 1 m V or less, when it is desired to obtain a frequency difference detection precision of 1 Hz, it is necessary to make the input frequency of the frequency voltage converter 70 10 kHz or less.

In addition, the frequency control range of the optical path length regulator 60 is 1 MHz, and a frequency voltage converter 72 which can detect a frequency difference in all frequencies in the control range is necessary. Here, when the frequency difference between the reference frequency signal and the clock signal is small, the optical path length regulator 60 can be controlled by the output signal of the frequency voltage converter 70.

In the present embodiment, a frequency voltage converter 70 and a frequency voltage converter 72 having a differing frequency detection range are used, and the optical path length regulator 14 is controlled by the output signal from the frequency voltage converter 70, and the optical path length regulator 60 is controlled by the output signal from the frequency voltage converter 70 or the frequency voltage converter 72.

Fourth Embodiment

Figure 3:
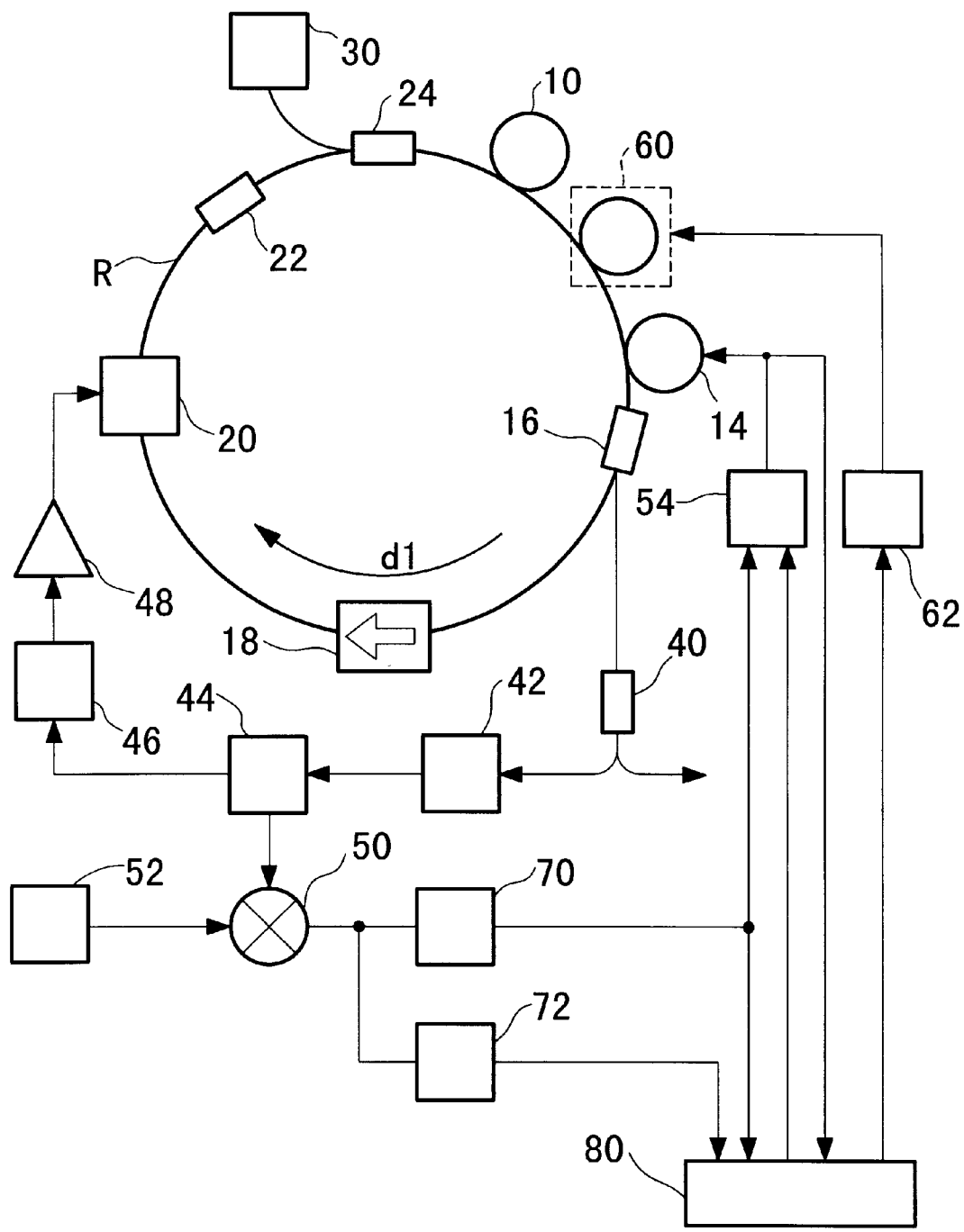
FIG. 3 is a block diagram showing the structure of the optical pulse generator according to the forth embodiment of the present invention.

Next the fourth embodiment of the present invention will be explained in reference to FIG. 3. FIG. 3 is a block diagram showing the structure of the optical pulse generator according to the fourth embodiment of the present invention, and the same reference symbols denote the same parts of the optical pulse generator according to the third embodiment of the present invention shown in FIG. 2, and their explanation is omitted.

The optical pulse generator according to the fourth embodiment of the present invention shown in FIG. 3 and the optical pulse generator according to the third embodiment shown in FIG. 2 differ on the point between the frequency voltage converter 70, the frequency voltage converter 72, and the control circuits 54 and 62 a microprocessor (central control means) 80 is provided.

In the explanation of the above-described first through third embodiments, the limit of the control range of the optical path length regulator 14 was described. In the third embodiment, a method of separate control of the optical path length regulator 14 and the optical path length regulator 60 is disclosed.

However, it is unclear where in the control range of the optical path length regulator 14 is positioned, and provisionally when the limit of the control range is exceeded high precision control of the frequency becomes impossible. That is, because it is unclear to what degree the optical path length regulator 14 can control the length of the loop of the ring type resonator R in the direction of lengthening, or to what degree it can control the length of the loop in the direction of shortening, high precision control when the limit of the control range is exceeded becomes impossible.

In the fourth embodiment of the present invention, the control voltage to the optical path length regulator 14 and the output voltage of the frequency voltage converters 70 and 72 is detected by a microprocessor 80, and the control circuit 62 of the optical path length regulator 60 is controlled so that the optical path length regulator 14 does not exceed the limit of the control range. In this manner, the optical path length regulator 14 does not exceed the limit of the control range, and high precession frequency control is always possible.

Fifth Embodiment

Next, the fifth embodiment of the present invention will be explained. The structure of the optical pulse generator according to the fifth embodiment of the present invention is roughly similar to the optical pulse generator according to the fourth embodiment shown in FIG. 3.

The fifth embodiment of the present invention is for controlling the frequency difference detected by the frequency difference detector 44 when it is below the detection range of the frequency voltage converter 70.

In explaining the third embodiment of the present invention, there existed a mode at the cycling frequency f=10 GHz wherein the pulse oscillated at about a 1 MHz interval. For high precision frequency control, the frequency difference between the reference frequency signal output from the synthesizer 52 and the clock signal output from the clock extractor 42 must be equal to or less than the detection range of the frequency voltage converter 70. The detection range of the frequency voltage converter 70 is, for example, 10 kHz or less.

In the fifth embodiment of the present invention, the output voltage of the frequency voltage converters 70 and 72 are detected by the microprocessor 80, and the control circuits 54 and 62 of the optical path length regulators 14 and 70 are controlled so that the frequency difference between the reference frequency signal and the clock signal lies within the detection range of the frequency voltage converter 70.

Here, if the frequency difference between the reference frequency signal and the clock signal is equal to or less than 1 MHz, detection of the frequency difference by the frequency voltage converter 72 is possible, and when the frequency difference is large, the optical circuit 62 of the optical path length regulator 72 is controlled. In addition, if the frequency difference between the reference frequency signal and the clock signal is, for example, 10 kHz, and is in a range which can be sufficiently controlled by the optical path length regulator 60, then the control circuit 54 of the optical path length regulator 14 is controlled.

Sixth embodiment

Next, the optical pulse generator according to the sixth embodiment of the present invention will be explained. The structure of the optical pulse generator according to the sixth embodiment of the present invention is roughly similar to the optical pulse generator according to the fourth embodiment shown in FIG. 3.

The sixth embodiment of the present invention is for control of the optical path length regulator 60 after the frequency difference detected by the frequency difference detector 44 falls below the detection range of the frequency voltage converter 70.

In the fifth embodiment described above when the frequency difference between the reference frequency signal and the clock signal was large, the control circuit 62 of the optical path length regulator 60 is controlled.

Here, the frequency difference detector 50 outputs only the frequency of the frequency difference between the reference frequency signal and the clock signal, and does not output information on their size relation. In addition, the detection of this frequency difference is performed by the frequency voltage converter 72, but usually the output of the frequency voltage converter generates the output voltage proportional to the input frequency.

When the frequency control is by controlling the optical path length regulator 60, it is necessary to detect the size relationship between the frequencies of the reference frequency signal and the clock signal.

Figure 4:
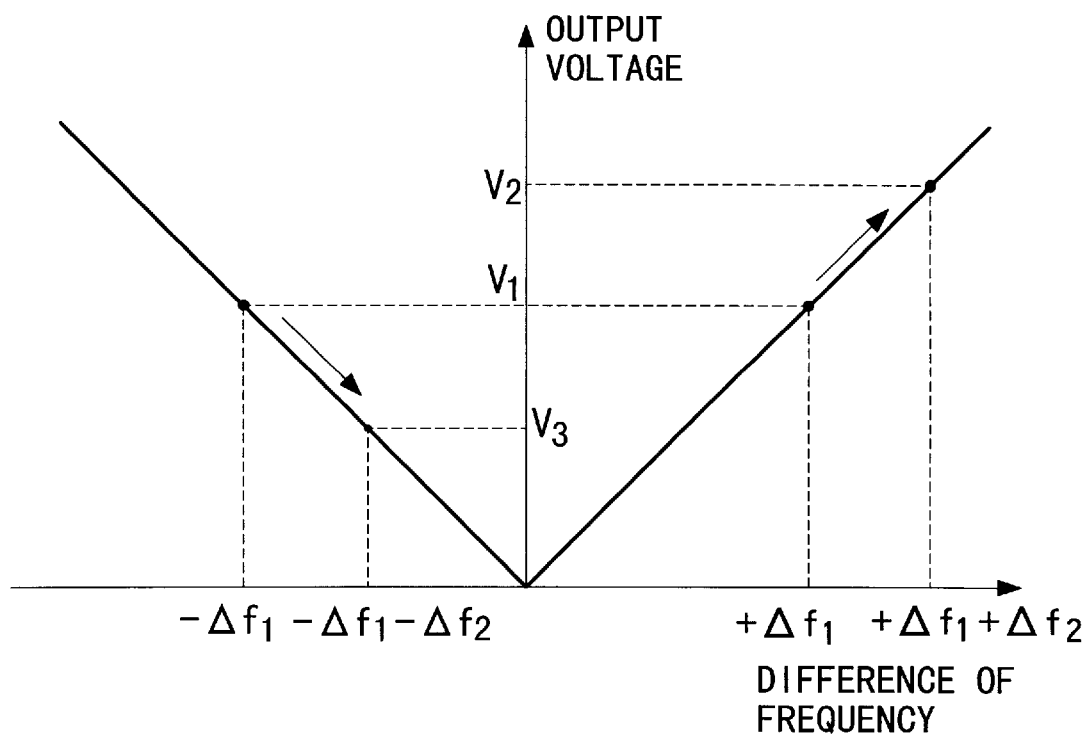
FIG. 4 is an explanatory diagram showing the relation between the output of the frequency difference between the reference frequency signal and the clock signal, and the frequency voltage converter.

FIG. 4 is a drawing for explaining the relationship of the output of the difference frequency between the reference frequency signal and the clock signal, and the output of the frequency voltage converter 72. When the difference frequency between the reference frequency signal and the clock signal is $\Delta f_1$, $+\Delta f_1$ and $-\Delta f_1$ are the symbols that carry the information concerning the size relationship between the reference frequency signal and the clock signal.

In either the case of $+\Delta f_1$ or $-\Delta f_1$, the output of the frequency voltage converter is $V_1$.

Here, when the difference frequency of the frequency between the reference frequency signal and the clock signal is $\Delta f_1$, when the frequency of the clock signal is changed only $+\Delta_1$ by controlling the optical path length regulator 14, the difference frequency is $+\Delta f_1 + \Delta f_2$ or $-\Delta f_1 + \Delta f_1$, and the output of the frequency voltage converter 72 is $V_2$ or $V_3$. By detecting the behavior at this time, the size relationship of the frequencies of the reference frequency signal and the clock signal can be recognized.

In the sixth embodiment of the present invention, the frequency of the clock signal is changed by controlling the optical path length regulator 14, and the output of the frequency voltage converter 72 at this time is detected by a microprocessor 80, and thereby the size relationship of the frequencies of the reference frequency signal and the clock signal can be detected, and the control circuit of the optical path length regulator 60 can be controlled according to the result of this detection.

What is claimed is:

1. An optical pulse generator characterized in comprising:

laser pulse oscillator having in a ring an optical amplifying means having a gain at a specified frequency band, a first optical path length regulator which performs high precision optical path length regulation, a second optical path length regulator which performs wide-range optical path length regulation, and an optical modulator which modulates incident light and converts it into optical pulse;

a clock signal extractor which converts the optical laser pulse emitted from said laser pulse oscillator to an electrical signal, and extracts a clock signal of a cycling frequency which is an integral multiple of a basic frequency corresponding to the loop length of said loop;

a frequency difference detector which detects a frequency difference between a specified reference frequency signal and said clock signal; and a control means which controls said first optical path length regulator and said second optical path length regulator according to the output signal of said frequency difference detector.

2. An optical pulse generator according to claim 1 characterized in said second optical path length regulator adjusting the optical path length by applying a temperature change to an optical pulse compression optical fiber.

3. An optical pulse generator according to claim 1 and characterized in comprising:

a high precision first frequency voltage converter which bifurcates the output of said frequency difference detector, and inputs one part of said output;

a broad frequency bandwidth second frequency voltage converter which inputs the other of said outputs;

a first control means which controls said first optical path length regulator by the output signal of said first frequency voltage converter; and a second control means which controls said second optical path length regulator by the output signal of said first and second frequency voltage converter.

4. An optical pulse generator according to claim 3 characterized in comprising a central control means which detects the control signal to said first optical path length regulator and the output signal said frequency difference detector, and controls said second optical path length regulator so that the control signal to said first optical path regulator does not exceed a specified control limit.

5. An optical pulse generator according to claim 4 characterized in said central control means detecting the output signal of said frequency difference detector, and when the frequency detection range of said first frequency voltage converter is exceeded, causes said first and second optical path length detector to enter within the detection range of said first frequency voltage converter.

6. An optical pulse generator according to claim 5 characterized in said central control means controlling said second optical path length regulator by determining the size relationship between the frequency of said base frequency signal and said clock signal by applying a change to said first optical path length detector and detecting the output signal from said frequency difference detector.

7. An optical pulse generator according to claim 1 characterized in comprising a central control means which detects the control signal to said first optical path length regulator and the output signal said frequency difference detector, and controls said second optical path length regulator so that the control signal to said first optical path regulator does not exceed a specified control limit.

8. An optical pulse generator according to claim 2 characterized in comprising a central control means which detects the control signal to said first optical path length regulator and the output signal said frequency difference detector, and controls said second optical path length regulator so that the control signal to said first optical path regulator does not exceed a specified control limit.

9. An optical pulse generator according to claim 2 characterized in comprising:
- a high precision first frequency voltage converter which bifurcates the output of said frequency difference detector, and inputs one part of said output;
- a broad frequency bandwidth second frequency voltage converter which inputs the other of said outputs;
- a first control means which controls said first optical path length regulator by the output signal of said first frequency voltage converter; and
- a second control means which controls said second optical path length regulator by the output signal of said first and second frequency voltage converter.

* * * * *